United States Patent Office 2,713,005
Patented July 12, 1955

2,713,005

PHTHALOCYANINE PIGMENTS

Arne Christian Baunsgaard and Börge Ingemann Knudsen, Olbylyng, pr. Koge, Denmark, assignors to Kemisk Vaerk Koge A/S, Copenhagen, Denmark, a firm No Drawing. Application August 28, 1951,
Serial No. 244,108

Claims priority, application Netherlands August 29, 1950

4 Claims. (Cl. 106—288)

It is well known that phthalocyanine and substituted phthalocyanine particularly phthalocyanines substituted by halogen in one or more of the benzene nuclei, when finely dispersed, form colour pigments having a considerable tinctorial strength and great fastness or stability. This applies also to certain metal compounds of phthalocyanine and of derivatives thereof, particularly to metal compounds, the central metal of which is copper. The tinctorial strength of copper phthalocyanine when this substance is well dispersed is thus twice the tinctorial strength of milori blue and 20–30 times that of ultramarine.

Although apparently there is no one group of the periodic system of elements in which metals are included, without there also being metals therein from which phthalocyanine compounds can be produced and although metals having 1 to 4 valencies can be used, in real practice so far no other metal than copper has been used as the central metal in phthalocyanine pigments. By using other metals to occupy the central position in the phthalocyanine molecule compounds the tint or hue of which is impure, the fastness of which is unsatisfactory, or the production of which can only be carried out with bad yield, are obtained. On the other hand on using phthalocyanine having no metal in the central position or by introducing certain substituents in the phthalocyanine molecule, particularly chlorine or other halogens as mentioned above, a certain variation of the tint can be obtained and such compounds may advantageously be used as a constituent of pigment mixtures. In the following the phthalocyanine pigment or the phthalocyanine pigments forming the chief constituent of the pigment upon which its fastness depends will be designated as the principal pigment. The principal pigment may thus be copper phthalocyanine or metal-free phthalocyanine or derivatives of either of these compounds substituted in the phthalocyanine radical, particularly in its benzene groups, or it may be a metal compound of phthalocyanine containing as metal atom occupying the central position a metal which imparts to the compound a similar fastness as copper.

The fastness of compounds of this kind in most cases does not depend only on fastness to light or to air, or on stability to chemicals to the influence of which the pigment may be exposed during its use, for instance soap, alkali and the like, but it also depends upon fastness to the constituents of vehicles, such as oil or lacquers or various organic solvents with which it may be used and to the chemicals used in connection with the dispersing of the pigment. One of the dispersing methods used in connection with these pigments consists in dissolving and suspending the compound in a strong acid, for instance sulphuric acid, and precipitating it by suddenly pouring the solution or suspension into water. The high degree of fineness which can be obtained by this or similar methods plays an important part in the use of these substances as pigments, but on the other hand it calls for great fastness of the substances to chemicals which restricts the possibility in the choice of the compound to be used for the principal pigment. This is one of the circumstances which has been responsible to the fact that practically only the above named phthalocyanine compounds have actually been employed as pigments.

Even when phthalocyanine compounds satisfying such high demands of fastness are used as principal pigment, nevertheless a disadvantage may be experienced in the use of these substances which have a tendency to exhibit crystal growth, especially when in contact wtih aromatic hydrocarbons, which are frequently used as constituents in oil paints, varnishes or printing inks. As one consequence of such crystal growth, the tinctorial strength considerably decreases. If crystal growth has occurred and if the dispersion has consequently become unsatisfactory it is impossible by means of the methods used in the production of varnishes, oil paint or printers' ink to reestablish a satisfactory degree of dispersion. This circumstance has been a bar to the introduction of these substances as pigments in paints, varnishes, lacquers and printers' ink.

It has been proposed to avoid this disadvantage by mixing the principal pigment with a comparatively small amount of phthalocyanine compound containing tin as the centrally bound metal. Although only two valencies of the central metal are used in each phthalocyanine residue both stannous and stannic compounds are known. In the latter, two of the valencies may be saturated by halogen or the central metal may be common to two phthalocyanine residues. Such tin phthalocyanines cannot be dispersed by the acid precipitation method without decomposition, but they must be dispersed in a mechanical way and then admixed with the principal pigment either in the dry state of in the production of a colour, such as a paint or varnish, therefrom, but nevertheless they cause the rate of crystallization of the principal pigment to decrease greatly, so that by making use thereof it has been possible to produce pigments and colour compositions such as paints or varnishes with phthalocyanines which colour compositions under usual conditions of storage maintain a satisfactory tinctorial strength for a sufficient length of time.

One object of the present invention is to provide pigments containing a phthalocyanine pigment of the above named kind as a principal pigment, i. e. one upon which the tinctorial strength and fastness of the pigment as a whole essentially depends and, as a stabilizing agent, a phthalocyanine compound differing from the principal pigment in the kind of the central metal atom and having other properties distinct from those of the tin phthalocyanines.

A further object of the invention is to use for this purpose a phthalocyanine having a high stabilizing power at comparatively high temperatures.

A still further object of the invention is to produce pigment mixtures of the kind mentioned above in which a satisfactory stabilizing effect is also obtained at lower temperatures.

Again, it is an object of the invention to provide coating compositions, such as paints for brushing or spraying or varnishes or printing ink, containing the mixtures mentioned above, together with a vehicle.

With these and still further objects in view, which will appear from the following description, we shall proceed to describe an embodiment of the invention.

The invention is based on the discovery that the property of decreasing or impeding the tendency of principal pigments of the kind in question to crystal growth is not only possessed by tin phthalocyanines but also by compounds of phthalocyanine or its derivatives containing magnesium as the central atom. This is surprising, since this property is by no means common and could not be foreseen. Thus phthalocyanine compounds containing zinc, iron, calcium or many other metals as the central atom have no influence on the tendency of the principal pigments to crystal growth, whereas, on the contrary, a complete inhibition of crystal growth under certain conditions can be obtained with admixtures of magnesium phthalocyanine as low as 2 per cent or less, even if in certain cases somewhat greater additions are desirable.

Similar to tin phthalocyanine magnesium phthalocyanine and derivatives thereof which are substituted in the phthalocyanine residue, are not suitable as principal pigments for several reasons, and particularly because the tint is not particularly pure and because of poor fastness to light is bad. Magnesium phthalocyanine is not stable against strong acids and consequently it can not be dispersed by dissolving it in strong acid and precipitating it by pouring the solution into water. In consequence of this latter circumstance it must be dispersed by other methods, particularly by mechanical grinding, whereby products which are so finely dispersed that they possess a tinctorial strength comparable to that of the principal pigment. On the other hand this does not prevent the use of magnesium phthalocyanine or derivatives thereof as a stabilizing agent in accordance with the invention in connection with principal pigments consisting of or containing phthalocyanine compounds having a tendency to crystal growth under certain condition, for instance in contact with aromatic hydrocarbons. For this purpose the magnesium phthalocyanine compound is used only in such comparatively small proportions that the difficulties in dispersing it and the costs thereby involved are of no decisive importance, since the same fineness of the stabilizing agent as of the principal pigment is not essential. The admixture of the stabilizing agent may be carried out by simply mixing it with the dry principal pigment or in other ways, for instance in connection with salt grinding or if paints, varnish or printers' ink or other similar colour compositions are to be produced from the pigment, the admixture of the stabilizing agent may be carried out during the treatment of the pigment and vehicle on the usual roller mill or ball mill.

The properties of the magnesium phthalocyanine compounds as stabilizing agent differs to some extent from those of the known tin compounds. Thus it has been found that the stabilizing effect at lower temperatures, for instance 20° C., is comparatively small when certain auxiliary substances to be further described in the following are not present, whereas this effect is considerable at higher temperature, even when these auxiliary substances are not made use of and the effect is considerable at higher as well as at lower temperatures, when the said auxiliary substances are employed. Even without the employment of the auxiliary substances in question by adding only 3 per cent magnesium phthalocyanine to copper phthalocyanine at 80° C. the period of time required in the formation of the first trace of coarse crystals will be increased to about ten times the time required under the same condition without the said admixture. Consequently, the presence of stabilizing agents according to the present invention is of great importance to prevent crystal growth, for instance during the treatment of the pigment with the vehicle in connection with which it is to be used on roller mills in connection with which treatment the pigment will not infrequently be subjected to the influence of high temperatures in the presence of substances promoting crystal growth for so long time that crystal growth may occur.

In accordance with our copending application Serial No. 244,107, filed August 28, 1951, certain advantages are obtained by adding to a pigment of the kind in question or to colour compositions or printers' inks containing such pigments, certain organic basic substances, such as amines containing aliphatic or cycloaliphatic hydrocarbon residues in their molecule. Among the advantages obtained by the addition of such basic substances is that the effect of the stabilizing agent present is increased. Thus in conjunction with said auxiliary substances the stabilizing agents according to the present invention exhibit outstanding properties even at low temperatures.

The present invention therefore comprises also the addition to a principal pigment of the kind specified of the said stabilizing agent consisting of magnesium phthalocyanine and the derivatives thereof substituted in the phthalocyanine residue together with the auxiliary substances in question, i. e. the basic substances, the use of which forms the subject matter of Serial No. 244,107. Just as is the case with the stabilizing agent, the incorporation of these auxiliary substances may be effected by admixing the dry substances, for instance in a ball mill, or adding them to the pigment and vehicle during the treatment of these substances to form a coating composition or printers' ink by means of standard apparatus such as roller mills or ball mills.

In order to illustrate the present invention a number of experiments are reported in the following examples. In the experiments 25 ccm. of xylol per gram of phthalocyanine pigment is used as a vehicle in place of the usual vehicle binders in order to promote the crystal growth as much as possible and thus make the experiments more critical. Obviously this is only for illustrative purposes and in actual practice the usual vehicles or binders must be used in accordance with the character of the product to be obtained, for instance a painters' colour, printers' ink or varnish. Similar experiments have been carried out using other aromatic hydrocarbons promoting crystal growth, for instance benzene, and the results have been similar. In the experiment copper phthalocyanine (CuPC) and metal-free phthalocyanine (HPC) have been used, but other principal pigments can be used with the same result as to inhibition of crystal growth, for instance mono-chlorine copper phthalocyanine and mixtures of chlorine copper phthalocyanine and copper phthalocyanine. In the experiments the results of which are given, magnesium phthalocyanine has been used as the stabilizing agent, but it may be replaced by mono- or dichlorine magnesium phthalocyanine which, however, in some cases will show less effect than magnesium phthalocyanine, although both substances are to be considered as useful. The proportions of the stabilizing agent may be varied to a considerably higher extent than is the case in the experiments the result of which are given. A favourable effect will be found even when less than 3 per cent or more than 6 per cent is used. In the experiments the results of which are given, dodecyl amine has been used as the auxiliary substance improving the effect of the stabilizing agent at low temperatures, but other substances may be used in its place, viz. all the substances the employment of which forms the subject matter of Serial No. 244,107, for instance triethanol amine, monoethanol amine, morpholine, dicyclohexyl amine, 2-ethylhexyl amine, di-(2-ethylhexyl)-amine, butyl amine, diphenyl guanidine or piperidine.

| principal pigment | stabilizing agent | percentage of stabilizing agent in mixture | auxiliary substance | percentage of auxiliary in mixture | temperature at which the mixture is left, °C. | period of time at which the mixture is left | determination of the condition after standing |
|---|---|---|---|---|---|---|---|
| CuPC | nothing | 0 | nothing | 0 | 20 | 3 hours | crystal growth started. |
| CuPC | do | 0 | do | 0 | 80 | 10 min | Do. |
| CuPC | MgPC | 3 | do | 0 | 20 | 10 hours | Do. |
| CuPC | MgPC | 3 | do | 0 | 80 | 1½ hours | Do. |
| CuPC | MgPC | 3 | dodecyl amine | 10 | 20 | 1,500 hours | no crystal growth; tinctorial strength unchanged. |
| CuPC | MgPC | 3 | do | 10 | 80 | 160 hours | crystal growth started; slight decrease in tinctorial strength. |
| CuPC | MgPC | 6 | do | 10 | 138 | 2 hours | no crystal growth; tinctorial strength unchanged. |
| HPC | nothing | 0 | nothing | 0 | 80 | 3 min | almost complete recrystallization; coarse, weak in colour. |
| HPC | MgPC | 3 | dodecyl amine | 10 | 80 | 10 hours | crystal growth started. |
| HPC | MgPC | 6 | do | 10 | 80 | 35 hours | no crystal growth; tinctorial strength unchanged. |

We claim:

1. Phthalocyanine pigments comprising copper phthalocyanine and from about 2% to 6% by weight of a water insoluble magnesium phthalocyanine compound.

2. Phthalocyanine pigments comprising monochloro copper phthalocyanine and from about 2% to 6% by weight of a water-insoluble magnesium phthalocyanine compound.

3. Phthalocyanine pigments comprising a mixture of copper phthalocyanine and monochloro copper phthalocyanine and from about 2% to 6% by weight of a water-insoluble magnesium phthalocyanine compound.

4. Phthalocyanine pigments comprising a metal-free phthalocyanine and from about 2% to 6% by weight of a water-insoluble magnesium phthalocyanine compound.

References Cited in the file of this patent

UNITED STATES PATENTS

| | | |
|---|---|---|
| 2,192,704 | Dahlen et al. | Mar. 5, 1940 |
| 2,282,006 | Sloan | May 5, 1942 |
| 2,476,950 | Beard | July 26, 1949 |

OTHER REFERENCES

"Uses and Applications of Chemicals and Related Materials," Gregory, Reinhold Publishing Corp., N. Y., N. Y., pp. 298, 614.

"Review of Pigment Progress," Morgan Paint Mfg., November 1950, XX11, page 389.